United States Patent
Karnes

[15] 3,650,245
[45] Mar. 21, 1972

[54] FARROWING PEN

[72] Inventor: Wayne D. Karnes, Studley, Kans. 67759

[22] Filed: Jan. 2, 1970

[21] Appl. No.: 133

[52] U.S. Cl. ............................................................119/20
[51] Int. Cl. .......................................................A01k 01/02
[58] Field of Search..................................119/20, 16; 49/255

[56] References Cited

UNITED STATES PATENTS

| | | | |
|---|---|---|---|
| 3,318,286 | 5/1967 | Hargett, Jr. | 119/20 |
| 3,125,988 | 3/1964 | King | 119/20 |
| 3,084,668 | 4/1963 | McMurray et al. | 119/20 |
| 3,204,606 | 9/1965 | Parr et al. | 119/20 |
| 3,307,519 | 3/1967 | Rink et al. | 119/20 |

*Primary Examiner*—Hugh R. Chamblee
*Attorney*—Berman, Davidson and Berman

[57] ABSTRACT

A farrowing pen which can be assembled and disassembled and when disassembled may be stored in a relatively small area. The sow is confined to a relatively small space while the baby pigs are permitted to move about outside of the space in which the sow is confined so that they may avoid being crushed to death by the sow. THe sides of the pen are adjustable in height and the pen is provided with an entry gate reversibly hinged in its opening and a pivoted tailboard to facilitate the movement of the sow into and out of the confined area. The floor area is unobstructed for ease of cleaning the pen.

10 Claims, 11 Drawing Figures

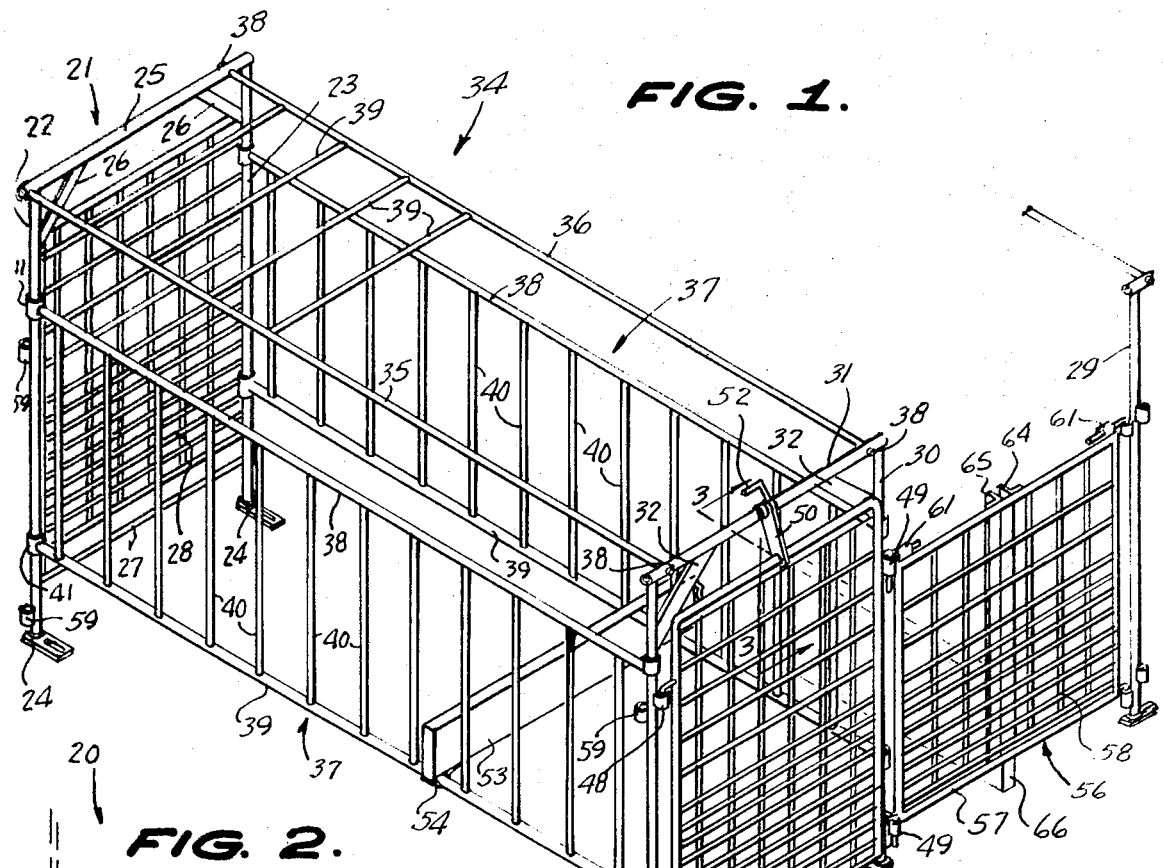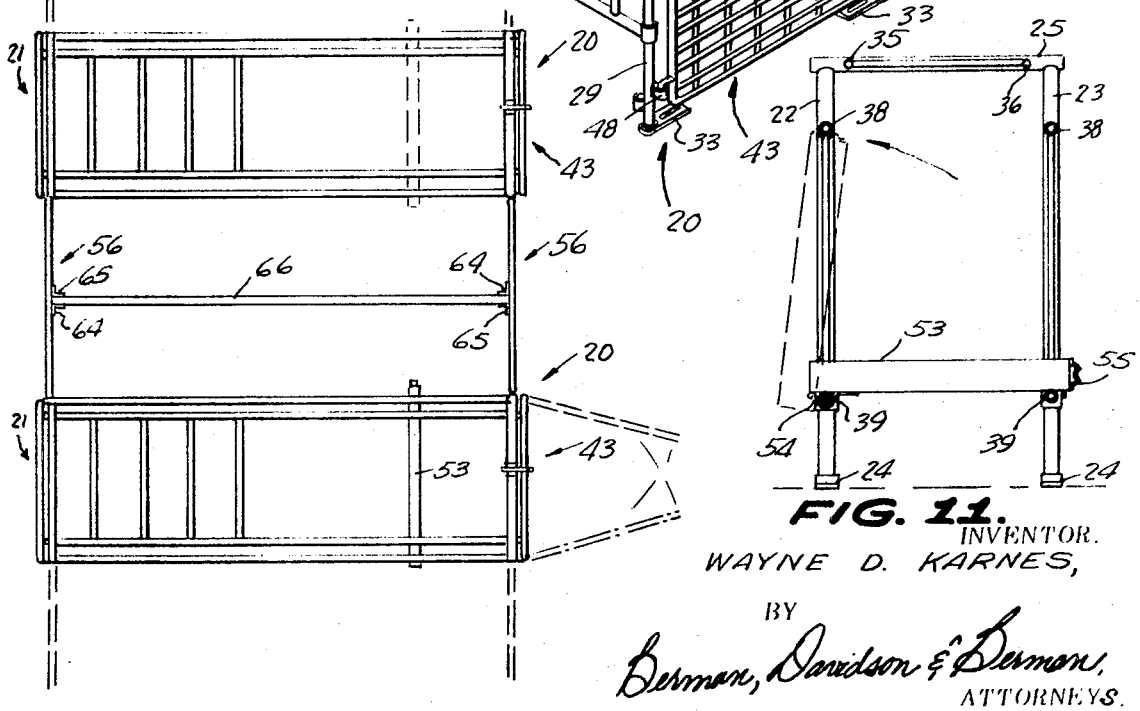

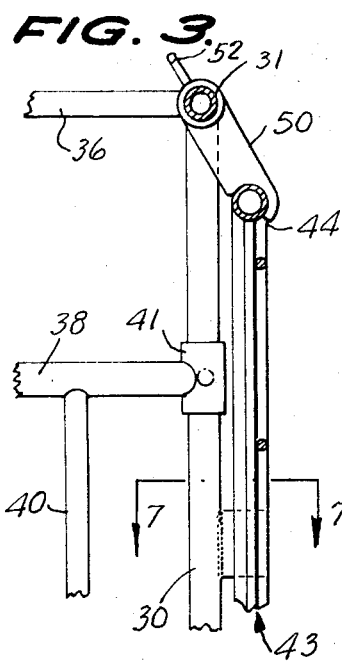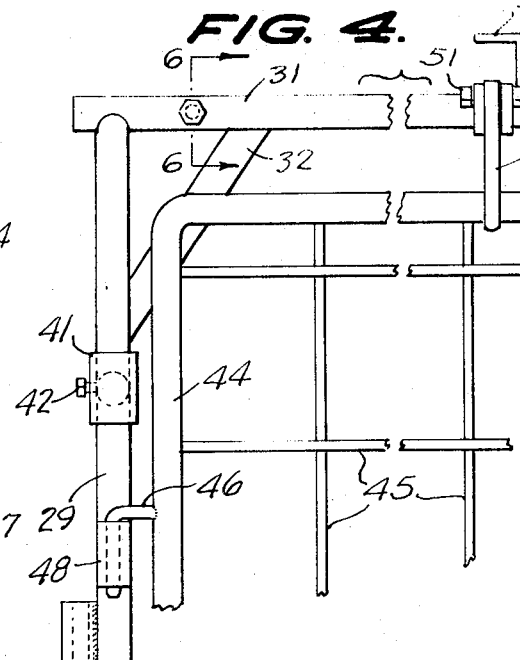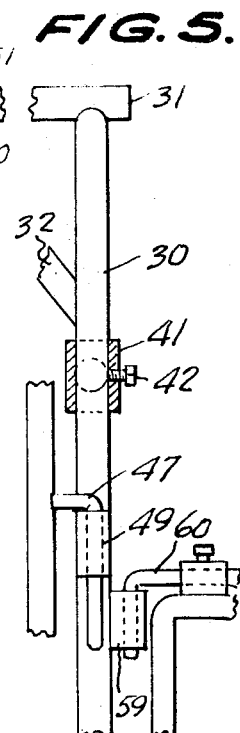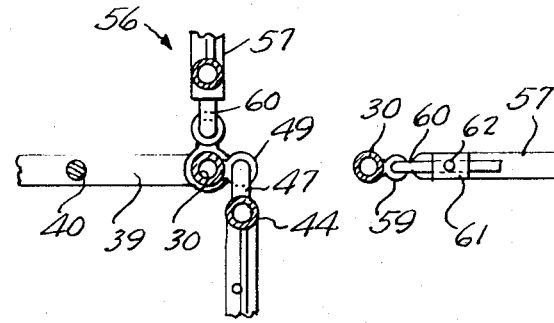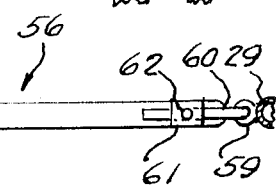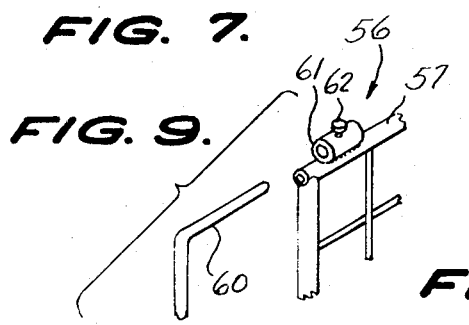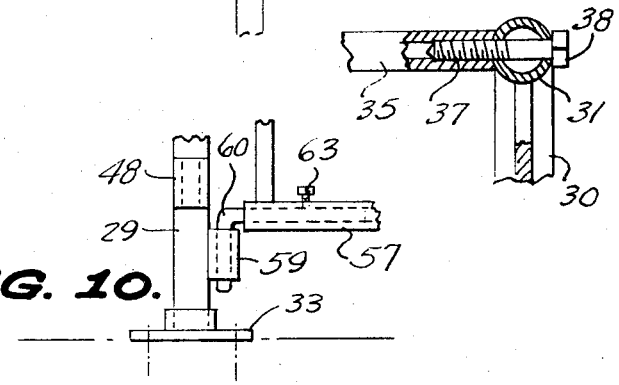

FARROWING PEN

BACKGROUND OF THE INVENTION

1. Field of the Invention

The present invention relates to farrowing pens which are constructed to confine a sow during and after the birth of the baby pigs to prevent the sow from rolling on the pigs and crushing them.

2. Description of the Prior Art

Most present day farrowing pens are constructed with floors having cross members at floor level to support the sides. Manure and other litter cannot be removed easily from such pens.

SUMMARY OF THE INVENTION

The present invention provides a farrowing pen which so confines the sow as to permit the baby pigs to avoid being crushed by the sow. The pen has vertically adjustable setscrew locked sides to permit free movement of the baby pigs; a gate which can be reversed to hinge from either side of the opening; a pivotally mounted longitudinally adjustable tail board to prevent rearward movement of the sow and an unobstructed floor to permit thorough and easy cleaning.

The primary object of the invention is to provide a knockdown relatively inexpensive farrowing pen which so confines the sow as to produce a minimum of baby pig deaths during their early days of life.

Other objects and advantages will become apparent in the following specification when considered in light of the attached drawings.

BRIEF DESCRIPTION OF THE DRAWINGS

FIG. 1 is a perspective view of the invention shown partially broken away for convenience of illustration;

FIG. 2 is a top plan view of the invention;

FIG. 3 is an enlarged fragmentary vertical cross section taken along the line 3—3 of FIG. 1 looking the the direction of the arrows;

FIG. 4 is a fragmentary end elevation of the invention partially broken away for convenience of illustration;

FIG. 5 is a fragmentary front elevation of the invention shown partially broken away and in section for convenience of illustration;

FIG. 6 is a fragmentary transverse cross section taken along the line 6—6 of FIG. 4 looking in the direction of the arrows;

FIG. 7 is a fragmentary horizontal section taken along the line 7—7 of FIG. 3 looking in the direction of the arrows;

FIG. 8 is a fragmentary top plan view of the connector panel;

FIG. 9 is a fragmentary perspective view of one of the hinge connectors;

FIG. 10 is a fragmentary end elevation of another of the hinge connectors; and

FIG. 11 is an end elevation of the tailboard shown in horizontal position with its raised position being shown in dotted lines.

DESCRIPTION OF THE PREFERRED EMBODIMENT

Referring now to the drawings in detail wherein like reference characters indicate like parts throughout the several figures. The reference numeral 20 indicates generally a farrowing pen constructed in accordance with the invention.

The farrowing pen 20 includes a rear wall 21 which consists of a pair of upright tubular legs 22, 23 arranged in spaced parallel relation and having horizontally extending slotted feet 24 secured to their lower ends. A cross bar 25 connects the upper ends of the legs 22, 23 and diagonal braces 26 extend across the corners thereof to form a rigid frame. A cross bar 27 parallel to the cross bar 25 connects the lower end portions of the legs 22, 23 to form a rectangular frame work for the end wall 21. A wire mesh panel 28 is connected to the legs 22, 23 to form the end wall 21.

A leg 29 is positioned forwardly of the leg 22 parallel thereto and a leg 30 is positioned forwardly of the leg 23 and parallel thereto. The legs 29, 30 are connected by a cross bar 31 extending parallel to the cross bar 25 and equal in height thereto. Braces 32 extend across the corners of the connection of the cross bar 31 with the legs 29, 30 respectively to make a rigid front frame. Slotted feet 33 are rigidly secured to the lower ends of the legs 29, 30 for reasons to be assigned.

A top frame generally indicated at 34 includes a pair of side rails 35, 36 secured at their opposite ends to the opposite ends of the cross bars 25, 31 respectively. The side rails 35, 36 are tubular and are internally threaded at 37 adjacent their opposite ends to receive a bolt 38 which extends through the cross bars 25, 31 and locks the side rails 35, 36 thereto forming a rigid frame. A plurality of cross bars 39 extend between the side rails 35, 36 adjacent the end wall 21 and are welded thereto to form with the side rails 35, 36 a top panel. A vertically adjustable side panel generally indicated at 37 is mounted on each side of the farrowing pen 20. Each of the side panels 37 include a top rail 38, a bottom rail 39 and a plurality of upright bars 40 extending between the top rail 38 and the bottom rail 39 and welded thereto. Each end of each of the side rails 38, 39 are provided with vertically extending tubular couplings 41 rigidly secured thereto and slidably mounted on the respective legs 22, 23, 29, 30. A setscrew 42 extends through each of the couplings 41 to claim the coupling 41 to its respective leg in vertically adjusted position. By loosening the setscrews 42 the side walls 37 can be raised or lowered to make minor adjustments of height.

A gate generally indicated at 43 closes the forward end of the farrowing pen 20. The gate 43 consists of a generally rectangular frame 44 having a wire mesh 45 secured thereto. The frame 44 has a pair of L-shaped hinge members 46 secured to one side thereof and a second pair of L-shaped hinge members 47 secured to the opposite side thereof. The hinge members 46 have a length substantially equal to that of a pair of sockets 48 welded to the front side of the post 29 in vertically spaced aligned relation. The hinge pins 47 have a length substantially twice that of the height of socket members 49 welded in vertically spaced aligned relation to the front side of the legs 30.

The gate 43 can be lifted so as to raise the hinge members 46 out of the sockets 48 to permit the gate 43 to be swung on the hinge members 47 in the sockets 49. If the gate 43 is to be swung in the opposite direction it is removed totally and the hinge members 47 are inserted in the socket members 48 and the hinge members 46 are inserted in the sockets 49. A latch bar 50 is pivotted on the cross bar 31 and is adapted to swing down and engage the horizontal frame member 44 of the gate 43 to prevent the gate 43 from being raised to disengage the hinge member 46 from the socket 48. The latch bar 50 is maintained in its central position on the cross bar 31 by a pair of retainer elements 51 which are welded to the cross bar 31 on opposite sides of the latch bar 50. An L-shaped rest 52 is welded to the cross bar 31 and is arranged to support the latch bar 50 when it is disengaged from the gate 43.

A tailboard 53 is secured to the side bar 39 by a spring hook 54 engaged thereover. The tailboard 53 is adapted to pivot around the side bar 39 from a position where its opposite end rests on the opposite side rail 39 to a position where its opposite end engages the side rail 38. A spring detent 55 on the tailboard 53 engages the side rail 38 at he upper extremity of its movement releasably latching the tailboard 53 in raised position as illustrated in dotted lines in FIG. 11.

A panel generally indicated at 56 extends between a pair of farrowing pens 20 at both the front and rear ends thereof to form additional runways for the baby pigs. Each of the panels 56 consist of a generally rectangular frame 57 having a wire mesh 58 secured thereto. A plurality of socket members 59 are secured to the legs 29, 30 and 22, 23 to receive L-shaped mounting pins 60 to support the panels 56 thereon. In the preferred forms of the invention illustrated in FIGS. 1, 7, 8 and 9, sockets 61 are welded to the upper and lower edges of the panel 56 to receive the horizontal end portions of the mounting pins 60. Setscrews 62 extend through the socket 61 to lock the pins 60 therein. In a modified form of the invention illustrated in FIG. 10 the pin 60 extends directly into a horizontal portion of the frame 57 and is secured therein by a setscrew 63.

A pair of spaced apart parallel angle iron members 64, 65 extend upright and are secured to the center of the panel 56 to support divider boards 66 positioned therebetween and extending to the rear panel 56 parallel to the side panels 37. As many divider boards 66 as are needed to prevent the baby pigs from getting into the next adjacent farrowing pen 20 are used.

In the use and operation of the invention the gate 43 is opened and the tail bar 53 is raised to its dotted line position as illustrated in FIG. 11 so that the sow may be placed in the farrowing pen 20 with her head closely adjacent the end wall 21. The side panels 37 are sufficiently close to each side of the sow so that it is impossible for her to turn to face the gate 43. With the sow in this position the tailboard 53 is dropped to its horizontal position as illustrated in solid lines in FIGS. 1 and 11 to thus prevent the sow from moving rearwardly toward the gate 43. The top panel 34 prevents the sow from climbing the rear wall 21 and thus she is restrained from almost any movement that could hurt the baby pigs. Following the birth of the pigs the sow is retained in this position while the baby pigs are permitted to move about between the tailboard 53 and the gate 43 and between the divider boards 66 at each side of the farrowing pen 20. The baby pigs can freely move under the side panels 37 in order to nurse the sow.

Following the farrowing season the top panel 34 is removed and the side panels 37 can then be collapsed toward each other if the space is required for other purposes. In the event that the farrowing pen is to be permanently installed in one position the feet 24, 33 can be bolted to the floor to increase the rigidity of the pen.

Having thus described the preferred embodiments of the invention it should be understood that numerous structural modifications and adaptations may be resorted to without departing from the spirit of the invention.

What is claimed is:

1. A farrowing pen comprising a pair of upright legs, an end wall supported on said legs, a second pair of upright legs spaced forwardly from said first pair of upright legs, a gate panel, means hingedly securing said gate panel to one of said legs, means locking said gate panel to the other of said upright legs with said gate panel being detachable from said last named means by vertical sliding movement, means connected to said second pair of upright legs for latching said gate panel against vertical sliding movement, a pair of oppositely disposed side panels, means mounting said side panels on said legs for vertical adjustment thereon, a top panel, means detachably securing said top panel to said legs, a tail board pivotally secured to the lower edge of one of said side panels and extending transversely across said farrowing pen in engagement with the other of said side panels, means on said tailboard for engagement with the upper edge of said side panel to detachably secure said tailboard in raised position.

2. A device as claimed in claim 1 wherein generally rectangular panels connect adjacent front and rear portions of adjacent farrowing pens in spaced parallel relation, a plurality of divider boards extend between said last named panels separating said adjacent farrowing pens and means on said last named panels support said divider boards in upright position.

3. A device as claimed in claim 2 wherein a plurality of L-shaped attaching pins are secured to said generally rectangular panels and a plurality of sockets are secured to said farrowing pens to receive said L-shaped attaching pins.

4. A device as claimed in claim 1 wherein resilient means detachably, and pivotally connects one end of said tailboard to the lower edge of said one of said panels.

5. A device as claimed in claim 4 wherein the means on said tailboard for engagement with the upper portion of said side panel comprises a resilient detent.

6. A device as claimed in claim 1 wherein said side panels are spaced above the ground and include a pair of vertically spaced side rails and a plurality of vertically extending bars rigidly connected thereto.

7. A device as claimed in claim 1 wherein said top panel includes a pair of oppositely disposed side rails and a plurality of transversely extending bars rigidly secured to said side rails in spaced parallel relation.

8. A device as claimed in claim 1 wherein said end wall includes a metallic mesh and means are provided securing said metallic mesh to said first named legs.

9. A farrowing pen comprising a pair of upright legs, an end wall supported on said legs, a second pair of upright legs spaced forwardly from said first pair of upright legs, a gate panel, means hingedly securing said gate panel to one of said legs, means locking said gate panel to the other of said upright legs with said gate panel being detachable from said last named means by vertical sliding movement, means connected to said second pair of upright legs for latching said gate panel against vertical sliding movement, a pair of oppositely disposed side panels, means mounting said side panels on said legs for vertical adjustment thereon, a top panel, means detachably securing said top panel to said legs, said means hingedly securing said gate panel to one of said legs comprises a pair of vertically spaced aligned socket members on one of said legs, a pair of inverted L-shaped hinge members fixedly secured to one side of said gate panel in vertically spaced aligned relation and each having a vertical pintle portion, said pintle portions having a length susbstantially twice the length of said socket members and being pivotally mounted in said socket members.

10. A device as claimed in claim 9 wherein, the means locking said gate panel to the other of said legs comprises a pair of vertically spaced aligned socket members on the other of said legs, a pair of inverted L-shaped lock members fixedly secured to the other side of said gate panel in vertically spaced aligned relation and each having a vertical pintle portion, said pintle portion having a length substantially the same as said socket member and being vertically slidably therein whereby upon vertical sliding movement of said gate panel said lock members are disengaged from their respective socket members and said gate panel is free to pivot about the hinge members in said first named socket members, said gate panel being reversable mounting the pintles of said hinge members in either of said sets of sockets for pivotal movement thereon.

* * * * *